(12) United States Patent
Fujii

(10) Patent No.: US 11,685,030 B2
(45) Date of Patent: Jun. 27, 2023

(54) SHAFT SEAL PACKAGING SLEEVE

(71) Applicant: MITSUBISHI CABLE INDUSTRIES, LTD., Tokyo (JP)

(72) Inventor: Nobukazu Fujii, Arida (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/835,003

(22) Filed: Jun. 8, 2022

(65) Prior Publication Data

US 2022/0397198 A1 Dec. 15, 2022

(30) Foreign Application Priority Data

Jun. 9, 2021 (JP) ................. 2021-096502

(51) Int. Cl.
*F16J 15/3268* (2016.01)
*F16J 15/3248* (2016.01)
*B25B 27/00* (2006.01)

(52) U.S. Cl.
CPC ....... *B25B 27/0028* (2013.01); *F16J 15/3268* (2013.01); *F16J 15/3248* (2013.01)

(58) Field of Classification Search
CPC .. F16J 15/3248; F16J 15/3252; F16J 15/3256; F16J 15/3264; F16J 15/3268; B25B 27/0028
See application file for complete search history.

(56) References Cited

U.S. PATENT DOCUMENTS

| | | | | |
|---|---|---|---|---|
| 4,218,813 A | * | 8/1980 | Cather, Jr. | .......... B25B 27/0028 29/464 |
| 4,815,884 A | * | 3/1989 | Halliday, Jr. | ........ F16J 15/3268 403/17 |
| 5,013,050 A | * | 5/1991 | Curtis | ................... F16J 15/3268 29/464 |
| 7,059,608 B2 | * | 6/2006 | Ramsay | ................. F16J 15/008 277/572 |
| 7,284,759 B2 | * | 10/2007 | Heldmann | .......... B25B 27/0028 277/351 |
| 7,651,102 B2 | * | 1/2010 | Heldmann | ........... F16J 15/3268 29/280 |
| 7,959,157 B2 | * | 6/2011 | Dobbs | .................. F16J 15/3268 277/572 |
| 8,292,302 B2 | * | 10/2012 | Heldmann | .......... B25B 27/0028 277/551 |

(Continued)

FOREIGN PATENT DOCUMENTS

EP 2 327 909 A1 6/2011
JP 2010-065729 A 3/2010

*Primary Examiner* — Nicholas L Foster
(74) *Attorney, Agent, or Firm* — Maschoff Brennan

(57) ABSTRACT

A cylindrical shaft seal packaging sleeve that is inserted in a shaft seal an inner peripheral surface of which slidably contacts with a rotation shaft includes an insertion end portion that is inserted in the shaft seal and a mounting end portion having a larger outer diameter than that of the insertion end portion, a chamfered portion is formed in each of the insertion end portion and the mounting end portion and a step portion having a larger outer diameter than that of the chamfered portion is provided in an axial deeper side than the chamfered portion, and a minimum diameter of the step portion in the insertion end portion is smaller than a minimum diameter of the shaft seal.

4 Claims, 3 Drawing Sheets

(56) References Cited

U.S. PATENT DOCUMENTS

| | | | | |
|---|---|---|---|---|
| 8,328,200 | B2* | 12/2012 | Battles | F16J 15/16 |
| | | | | 277/572 |
| 8,474,828 | B2* | 7/2013 | Heldmann | F16J 15/3268 |
| | | | | 277/551 |
| 8,756,784 | B2* | 6/2014 | Harmon | F16J 15/3268 |
| | | | | 29/463 |
| 8,910,948 | B2* | 12/2014 | Heldmann | B25B 27/0028 |
| | | | | 277/551 |
| 8,918,972 | B2* | 12/2014 | Battles | F16J 15/3268 |
| | | | | 277/551 |
| 9,511,486 | B2* | 12/2016 | Lammers | F16J 15/3268 |
| 9,636,810 | B2* | 5/2017 | Lammers | B25B 27/0028 |
| 10,029,356 | B2* | 7/2018 | Colineau | F16J 15/02 |
| 11,313,472 | B2* | 4/2022 | Arobbio | F16H 57/023 |
| 2005/0109889 | A1* | 5/2005 | Heldmann | B25B 27/0028 |
| | | | | 248/74.1 |
| 2005/0258181 | A1* | 11/2005 | Heldmann | B25B 27/0028 |
| | | | | 220/837 |
| 2010/0084417 | A1* | 4/2010 | Heldmann | F16J 15/32 |
| | | | | 220/200 |
| 2011/0179620 | A1* | 7/2011 | Harmon | F16J 15/3268 |
| | | | | 49/463 |
| 2012/0228834 | A1* | 9/2012 | Heldmann | F16J 15/3268 |
| | | | | 277/551 |
| 2013/0256995 | A1* | 10/2013 | Heldmann | F16J 15/32 |
| | | | | 277/551 |
| 2015/0267815 | A1* | 9/2015 | Lammers | F16J 15/3268 |
| | | | | 277/309 |
| 2017/0043461 | A1* | 2/2017 | Lammers | F16J 15/3268 |

* cited by examiner

SHAFT SEAL PACKAGING SLEEVE

CROSS-REFERENCE TO RELATED APPLICATION

The present application is a continuation application filed under 35 U.S.C. 111(a) claiming benefit under 35 U.S.C. 120 and 365(c) of Japanese Patent Application No. 2021-096502 filed on Jun. 9, 2021, the entire contents of which are incorporated herein by reference.

BACKGROUND OF THE INVENTION

1. Field of the Invention

The present disclosure relates to a cylindrical shaft seal packaging sleeve that is inserted in a shaft seal an inner peripheral surface of which slidably contacts with a rotation shaft.

2. Description of the Related Art

Conventionally, rotation shaft seals which include a resin seal element have been widely used. That is, rotation shaft seals which are assembled by pinch-pressing a resin seal element to retain the seal element by a metal outer case and a metal inner case have been known (see, for example, Japanese Unexamined Patent Publication No. 2010-065729).

Such a shaft seal which slidably contacts with a rotation shaft is shipped in a state where a sleeve-like packaging material is inserted along an inner periphery in many cases, and therefore, the shaft seal is mounted on an outer periphery of the rotation shaft from a shaft seal packaging sleeve at a use site.

SUMMARY OF THE INVENTION

However, as for known shaft seal packaging sleeves, if a shaft seal packaging sleeve is a thin molded article, an end surface in an insertion side or a mounting side tends to be damaged. A problem arises in which, if there is damage in an insertion side or mounting side end surface, a seal portion that slidably contacts with a rotation shaft is damaged in detaching and attaching, so that a seal performance is reduced.

In view of the foregoing, the present disclosure has been devised and it is therefore an object of the present disclosure to avoid damaging the shaft seal in detaching and attaching the shaft seal and thus prevent reduction of a seal performance thereof.

In order to achieve the above-described object, the present disclosure is directed to a cylindrical shaft seal packaging sleeve that is inserted in a shaft seal an inner peripheral surface of which slidably contacts with a rotation shaft. The shaft seal packaging sleeve includes an insertion end portion that is inserted in the shaft seal, and a mounting end portion having a larger outer diameter than that of the insertion end portion, a chamfered portion is formed in each of the insertion end portion and the mounting end portion and a step portion having a larger outer diameter than that of the chamfered portion is provided in an axial deeper side than the chamfered portion, and a minimum diameter of the step portion in the insertion end portion is smaller than a minimum diameter of the shaft seal.

DETAILED DESCRIPTION

Figure 1:
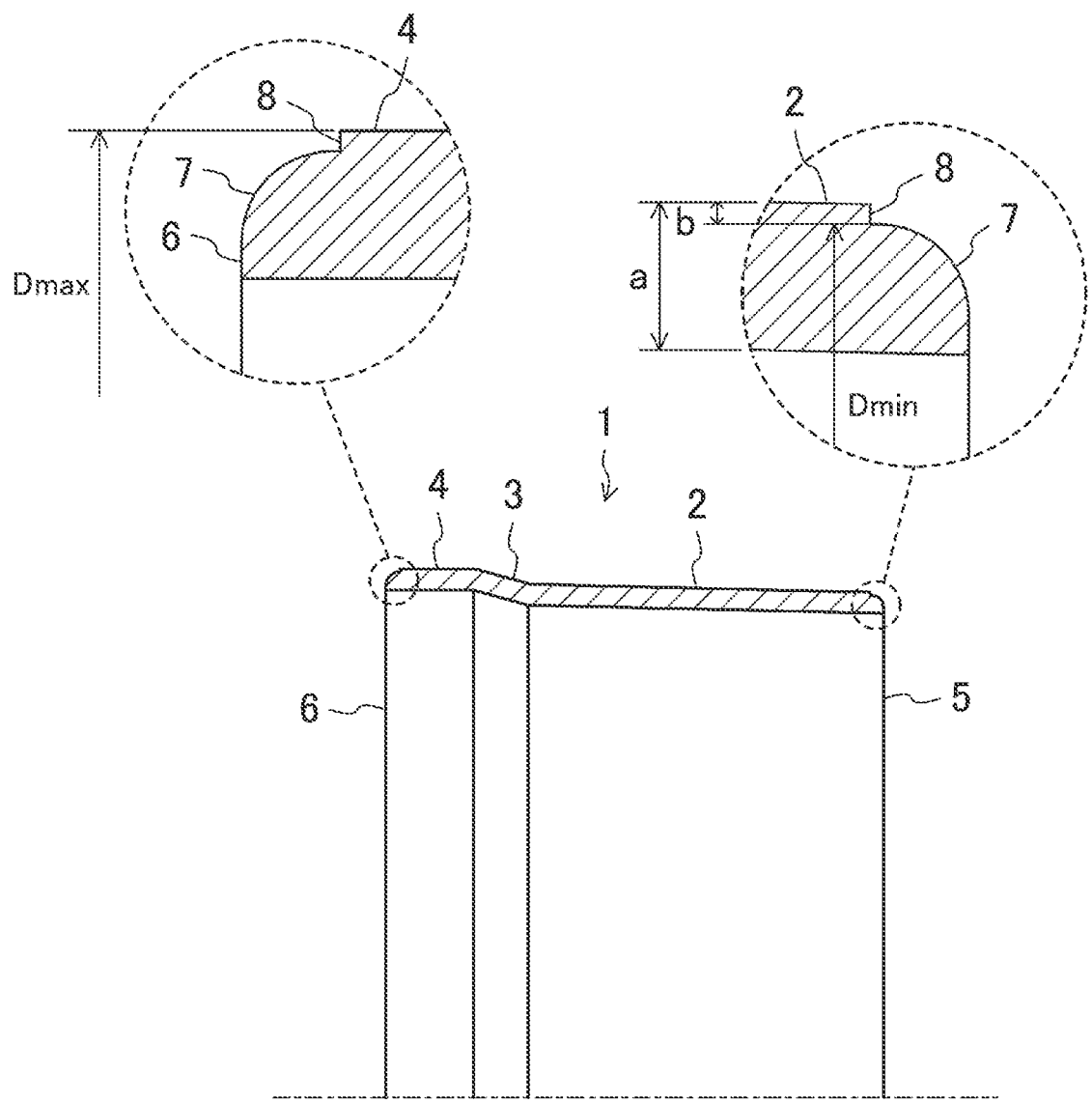
FIG. 1 is an enlarged cross-sectional view partially illustrating a packaging sleeve according to an embodiment of the present disclosure.

A first aspect of the present disclosure is directed to a cylindrical shaft seal packaging sleeve that is inserted in a shaft seal an inner peripheral surface of which slidably contacts with a rotation shaft. The shaft seal packaging sleeve includes an insertion end portion that is inserted in the shaft seal and a mounting end portion having a larger outer diameter than that of the insertion end portion, a chamfered portion is formed in each of the insertion end portion and the mounting end portion and a step portion having a larger outer diameter than that of the chamfered portion is provided in an axial deeper side than the chamfered portion, and a minimum diameter of the step portion in the insertion end portion is smaller than a minimum diameter of the shaft seal.

According to the above-described structure, the chamfered portion of the insertion end portion of the packaging sleeve has a smaller outer diameter than the minimum diameter of the shaft seal, and a portion that slidably contacts with the rotation shaft when the shaft seal is inserted contacts with the step portion in a deeper side than the chamfered portion without contacting with the chamfered portion. Therefore, even when the insertion end portion of the packaging sleeve is damaged, a damaged portion is less likely to contact with a slidably contacting portion of the shaft seal, so that the slidably contacting portion is less likely to be damaged. The step portion is also provided in the mounting end portion and the slidably contacting portion is less likely to contact with the chamfered portion even when the shaft seal moves from the step portion to a rotation shaft side in mounting on a shaft member, and therefore, the slidably contacting portion is less likely to be damaged even when the mounting end portion is damaged.

According to a second aspect of the present disclosure, in the first aspect, a maximum diameter of the mounting end portion in an opposite side to the insertion end portion is larger than the minimum diameter of the shaft seal.

According to the above-described structure, the shaft seal can be mounted on the rotation shaft side in a state where the mounting end portion is inserted in the rotation shaft, and the slidably contacting portion is less likely to be damaged at that time.

According to a third aspect of the present disclosure, the shaft seal packaging sleeve of the first or second aspect is formed of a cylindrical resin molded article.

According to the above-described structure, even the shaft seal packaging sleeve has a complicated shape including the chamfered portions and the step portions, the shaft seal packaging sleeve can be easily and inexpensively molded. Moreover, although, in a resin molded article, an end surface thereof tends to be damaged, in the shaft seal packaging sleeve, the step portion is provided, and therefore, the shaft seal is less likely to be damaged in detaching and attaching.

As has been described above, according to the present disclosure, it is possible to avoid damaging the shaft seal in detaching and attaching the shaft seal and thus prevent reduction of a seal performance thereof.

An embodiment of the present disclosure will be specifically described below with reference to the accompanying drawings.

Figure 2:
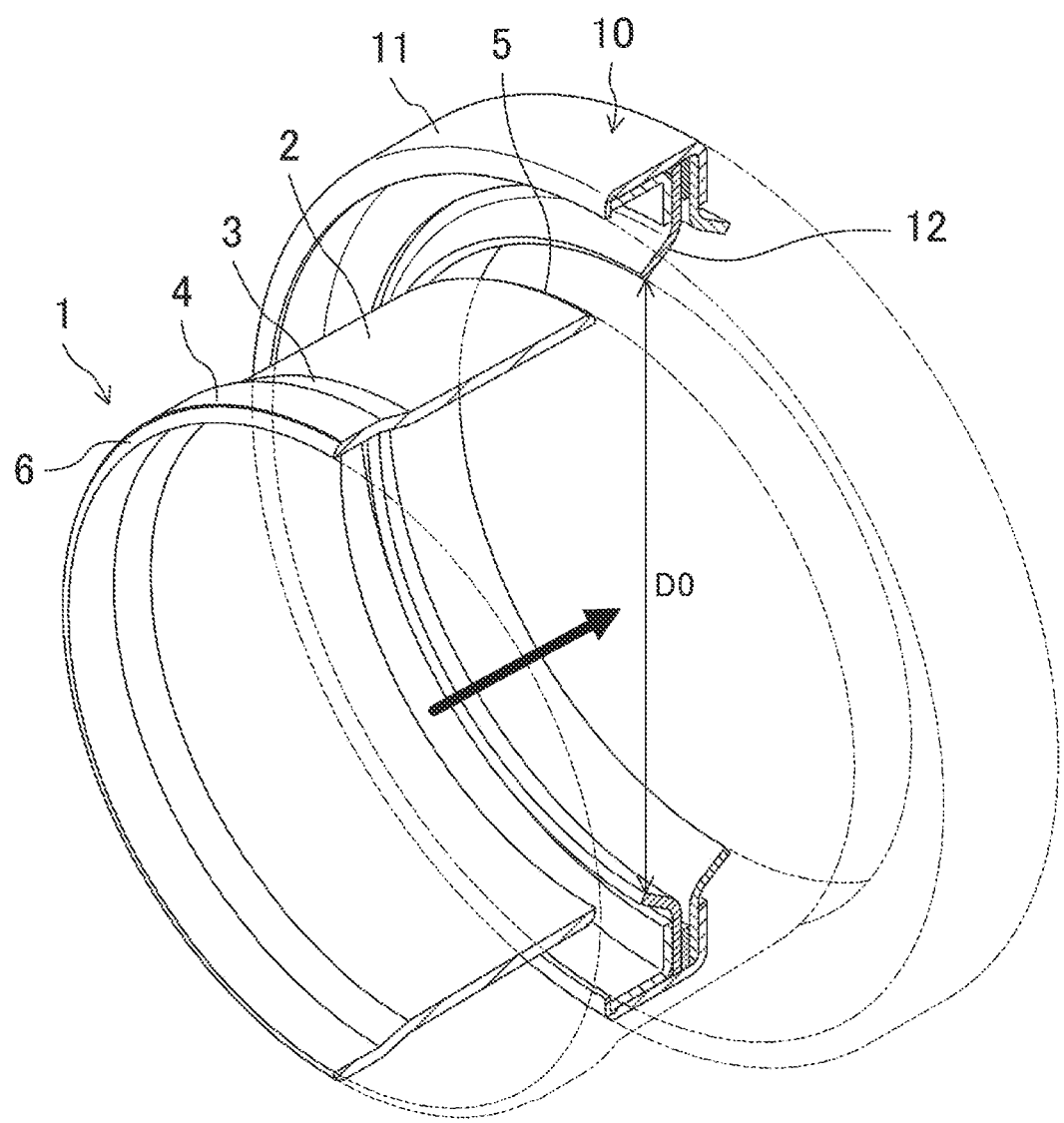
FIG. 2 is a perspective view of the packaging sleeve with a portion broken, illustrating how a seal is fitted to the packaging sleeve.

FIG. 1 and FIG. 2 illustrate a shaft seal packaging sleeve 1 according to an embodiment of the present disclosure. The shaft seal packaging sleeve 1 is formed of, for example, a cylindrical thin molded article and is inserted in a shaft seal 10 an inner peripheral surface of which slidably contacts with a rotation shaft (not illustrated). The shaft seal packaging sleeve 1 is a resin molded article, for example, having a thickness a of about 1 mm and formed of polytetrafluoroethylene (PTFE), nylon, polyethylene, or the like. A material and a thickness thereof are not limited thereto.

The shaft seal 10 is configured such that a lip portion 12 thereof serving as a slidably contacting portion protrudes on an inner peripheral surface and an outer periphery thereof is covered by an outer member 11. However, there is no particular limitation on the shaft seal if the shaft seal is a ring-shaped shaft seal. A material of the lip portion 12 can be tetrafluoroethylene resin, nitrile rubber, fluor rubber, silicone rubber, acrylic rubber, or the like and is not particularly limited to.

The shaft seal packaging sleeve 1 includes an insertion end portion 5 that is inserted in the shaft seal 10 and a mounting end portion 6 having a larger outer diameter than that of the insertion end portion 5. The insertion end portion 5, a first tapered portion 2, a second tapered portion 3, and a large diameter portion 4 are continuously formed such that an outer diameter gradually increases in this order starting from the insertion end portion 5 having a smallest outer diameter. The shaft seal 10 is packaged in a state where the shaft seal 10 is inserted in the first tapered portion 2 or the second tapered portion 3. At this time, it is preferable that the lip portion 12 is not deformed too match. In mounting the shaft seal packaging sleeve 1 on a shaft member, in a state where a large diameter portion 4 side is inserted in the shaft member, the shaft seal packaging sleeve 1 is mounted on an outer periphery of the shaft seal 10 such that the shaft seal 10 crosses over the large diameter portion 4. There is no particular limitation on an outer diameter, a material, or the like of the shaft member. Depending on a case, the shaft member may be a shaft that does not rotate.

A chamfered portion 7 is formed in each of the insertion end portion 5 and the mounting end portion 6. In this embodiment, as the chamfered portion 7, a round chamfer is formed, but a chamfer of either one of first and second modified examples that will be described later may be formed.

A step portion 8 having a larger outer diameter than that of the chamfered portion 7 is provided in an axial deeper side than the chamfered portion 7. A size b of the step portion 8 in a radius direction is 5% to 50% of the thickness a. For example, if it is assumed that the thickness a is 1 mm, the size of the step portion 8 is 0.05 mm to 0.5 mm in the radius direction. The step portion 8 is located in a deeper side than an end surface of the insertion end portion 5 and has a larger outer diameter than that of the chamfered portion 7. These dimensions are set such that, consequently, the lip portion 12 is less likely to contact with an end surface of the chamfered portion 7 when the shaft seal 10 is inserted from the insertion end portion 5.

A minimum diameter Dmin of the step portion 8 in the insertion end portion 5 is smaller than a minimum diameter D0 of the shaft seal 10 (Dmin<D0). That is, these dimensions are set such that the lip portion 12 is less likely to contact with an end surface of the chamfered portion 7 when the shaft seal 10 is inserted from the insertion end portion 5.

In this embodiment, the chamfered portion 7 of the insertion end portion 5 of the packaging sleeve has a smaller outer diameter than the minimum diameter of D0 of the shaft seal 10. Therefore, the lip portion 12 of the shaft seal 10 that slidably contacts with the rotation shaft first contacts with the step portion 8 in the axial deeper side than the chamfered portion 7 without contacting with the chamfered portion 7. Therefore, even when the insertion end portion 5 of the packaging sleeve is damaged, the insertion end portion 5 does not contact with the slidably contacting portion of the shaft seal 10, and therefore, the slidably contacting portion is less likely to be damaged.

The step portion 8 is also provided in the mounting end portion 6. The step portion 8 is located in the axial deeper side than an end surface of the insertion end portion 5 and has a larger outer diameter than that of the chamfered portion 7.

A maximum diameter Dmax of the mounting end portion 6 is larger than the minimum diameter D0 of the shaft seal 10 (Dmax>D0). Thus, the shaft seal 10 can be mounted on a rotation shaft side in a state where the mounting end portion 6 is inserted in the rotation shaft, and the shaft seal 10 does not contact with the chamfered portion 7 when the shaft seal 10 moves from the step portion 8 to the rotation shaft side. Therefore, even when the mounting end portion 6 is damaged, the slidably contacting portion is less likely to be damaged.

Furthermore, the shaft seal packaging sleeve 1 is a cylindrical resin molded article, and therefore, can be easily and inexpensively molded even with a complicated shape having the chamfered portions 7 and the step portions 8.

Therefore, according to the shaft seal packaging sleeve 1 according to this embodiment, it is possible to avoid damaging the shaft seal 10 in detaching and attaching the shaft seal 10 and thus prevent reduction of a seal performance thereof.

FIRST MODIFIED EXAMPLE

Figure 3:
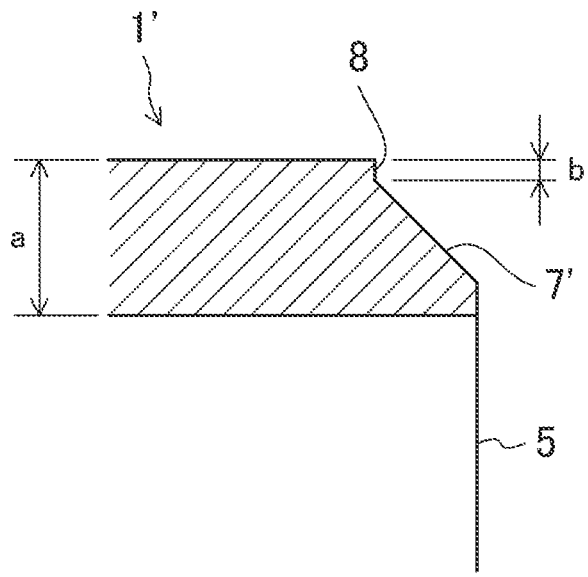
FIG. 3 is an enlarged cross-sectional view illustrating a step portion according to a first modified example of the embodiment of the present disclosure and a portion therearound.

FIG. 3 illustrates a shaft seal packaging sleeve 1' according to a first modified example of the above-described embodiment of the present disclosure. The first modified example is different from the above-described embodiment in a point that a chamfered portion 7' has a different shape. Note that, in each of modified examples below, each component common in FIG. 1 and FIG. 2 is identified by the same reference character, and the detailed description thereof will be omitted.

In the shaft seal packaging sleeve 1' of this modified example, a corner chamfer having a chamfer angle of 45 degrees is formed. However, the chamfer angle is not limited to 45 degrees.

The size b of the step portion 8 in the radius direction is 5% to 50% of the thickness a. In this modified example, for example, when the thickness a is 1 mm, the size of the step portion 8 is 0.2 mm (20%) in the radius direction. There is no particularly limitation on the size of the chamfered portion 7' in a radius direction. In this embodiment, the size of the chamfered portion 7' in the radius direction occupies about 70% of the thickness a.

Even in a case where the corner chamfers according to this modified example are formed, similar effects to those of the above-described embodiment can be achieved.

SECOND MODIFIED EXAMPLE

Figure 4:
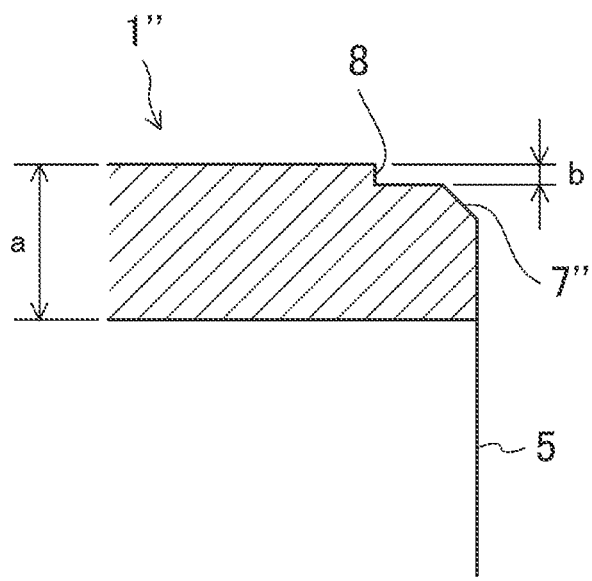
FIG. 4 is an enlarged cross-sectional view illustrating a step portion according to a second modified example of the embodiment of the present disclosure and a portion therearound.

FIG. 4 illustrates a shaft seal packaging sleeve 1" according to a second modified example of the above-described embodiment of the present disclosure. The second modified example is different from the first modified example in a point that a chamfered portion 7" has a different shape.

In this modified example, a size of a chamfer is smaller than that in the first modified example.

As described above, each chamfer may be either a round chamfer or a corner chamfer, and there is no particular limitation on a size thereof.

Note that the above-described embodiment is merely a preferable example by nature and is not intended to be particularly limiting the present disclosure, application of the present disclosure, and the scope of use.

What is claimed is:

1. A substantially cylindrical shaft seal packaging sleeve in combination with a shaft seal, the shaft seal packaging sleeve comprising:
   an inner peripheral surface for slidable contact with a rotation shaft;
   an insertion end portion for insertion in the shaft seal, the insertion end portion having a chamfered portion and a step portion; and
   a mounting end portion having a larger outer diameter than that of the insertion end portion, the mounting end portion having a chamfered portion and a step portion,
   wherein each step portion has a larger outer diameter than that of each chamfered portion, and each step portion being provided more to an axial inside of the shaft seal packing sleeve than the chamfered portions, and
   wherein a minimum diameter of the step portion in the insertion end portion is smaller than a minimum diameter of the shaft seal.

2. The shaft seal packaging sleeve of claim 1, wherein a maximum diameter of the mounting end portion, in an opposite side to the insertion end portion, is larger than the minimum diameter of the shaft seal.

3. The shaft seal packaging sleeve of claim 1, wherein:
   the shaft seal packaging sleeve is formed of a cylindrical resin molded article.

4. The shaft seal packaging sleeve of claim 2, wherein:
   the shaft seal packaging sleeve is formed of a cylindrical resin molded article.

* * * * *